United States Patent
Chambers et al.

[11] Patent Number: 5,862,846
[45] Date of Patent: Jan. 26, 1999

[54] FEED ARM

[75] Inventors: Eric B. Chambers; Glenn E. Cagle, both of Ackerman, Miss.

[73] Assignee: Chambers Delimbinator, Inc., Ackerman, Miss.

[21] Appl. No.: 143,139

[22] Filed: Aug. 28, 1998

[51] Int. Cl.⁶ ....................................................... B27L 1/00
[52] U.S. Cl. ................... 144/341; 144/24.13; 144/208.7; 144/343
[58] Field of Search .............................. 144/24.13, 208.1, 144/208.7, 340, 341, 343

[56] References Cited

U.S. PATENT DOCUMENTS 5,249,613  10/1993  Ridler .................................. 144/208.7

*Primary Examiner*—W. Donald Bray
*Attorney, Agent, or Firm*—Mary M. Moyne; Ian C. McLeod

[57] ABSTRACT

A feed arm (10) for use with a debarking and delimbing machine (100). The arm is constructed of a first section (12) and a second section (14) which are slidably connected together using an insert (16). The first section is securely mounted on the lower frame (114) of the machine adjacent the end opening (108) at the infeed side opening (110). The feed arm acts to move and guide the trees (150) to be debarked and delimbed into the flailing station (102) of the machine.

14 Claims, 4 Drawing Sheets

FEED ARM

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION (1). Field of the Invention

The present invention relates to a feed arm for use with an open ended delimbing and debarking machine. In particular, the present invention relates to a feed arm which is mounted on the infeed side of the delimbing and debarking machine adjacent the end opening and which is angled such as to guide the trees inward and downward toward the end opening and the flailing station of the machine.

(2). Description of the Related Art

Debarking and delimbing machines having end openings or side openings are known in the art. Illustrative are U.S. Pat. Nos. 4,787,431 to Demlow and 4,989,655 to Peterson et al. Demlow shows an open ended and open sided debarking and delimbing machine having upper and lower flail drums.

Peterson et al describes a flail type apparatus for debarking/delimbing tree stems. The apparatus includes lower and upper flails. The upper flails are mounted on an upper rotating shaft which is mounted on a floating head. The side wall of the housing of the apparatus is provided with a slotted opening to permit lateral sliding of a stem bundle into the flails.

Peterson et al also describes a pivotal ramp mounted to the side of a fixed ramp on the debarking/delimbing apparatus. In the raised position, the pivotal ramp is adapted to receive a stem bundle maneuvered by a boom mounted grapple. In the lowered position, the pivotal ramp cooperates with the fixed ramp for receiving a stem bundle maneuvered by a shredder mounted grapple. An upper guide cooperates with either the pivotal or fixed ramp to guide the bundles into the opening.

There remains the need for a feed arm for use with a debarking and delimbing machine which guides the trees down and into the flailing station of the machine and which is collapsible such as to allow easier transportation of the machine.

SUMMARY OF THE INVENTION

The feed arm of the present invention allows for easy and accurate positioning of the trees in the flailing station of a debarking and delimbing machine. The feed arm allows for continuous movement of the trees through the flailing station of the machine using a loader. The feed arm eliminates the need for the loader operator to stop the movement of the trees to position the trees. The loader operator does need to accurately position the trees in the end opening of the machine to enable complete and thorough debarking and delimbing of the trees. The feed arm of the present invention aids in moving the trees inward and downward between the upper and lower flail drums of the machine. The angling of the feed arm allows for gravity to be used to help position the trees. The feed arm is constructed of two detachable sections such that the outer section of the arm is removable prior to transporting the machine. This prevents the arm from extending beyond the end of the machine. Thus, the overall size of the machine does not change.

The substance and advantages of the present invention will become increasingly apparent by reference to the following drawings and the description.

BRIEF DESCRIPTION OF THE DRAWING(S)

FIG. 1 is a schematic perspective view of the feed arm 10 mounted on the delimbing and debarking machine 100.

FIG. 2 is a side view of the machine 100 with the feed arm 10 attached, showing the positioning of the trees 150 as the trees 150 are moved through the end opening 108 of the machine 100.

FIG. 3 is a side view of the feed arm 10 as viewed from line 3—3 of FIG. 1 showing the first and second sections 12 and 14 of the feed arm 10 and the brace 18.

FIG. 4 is a schematic representation of the movement of the trees 150 through the machine 100.

DESCRIPTION OF THE PREFERRED EMBODIMENT(S)

Figure 1:
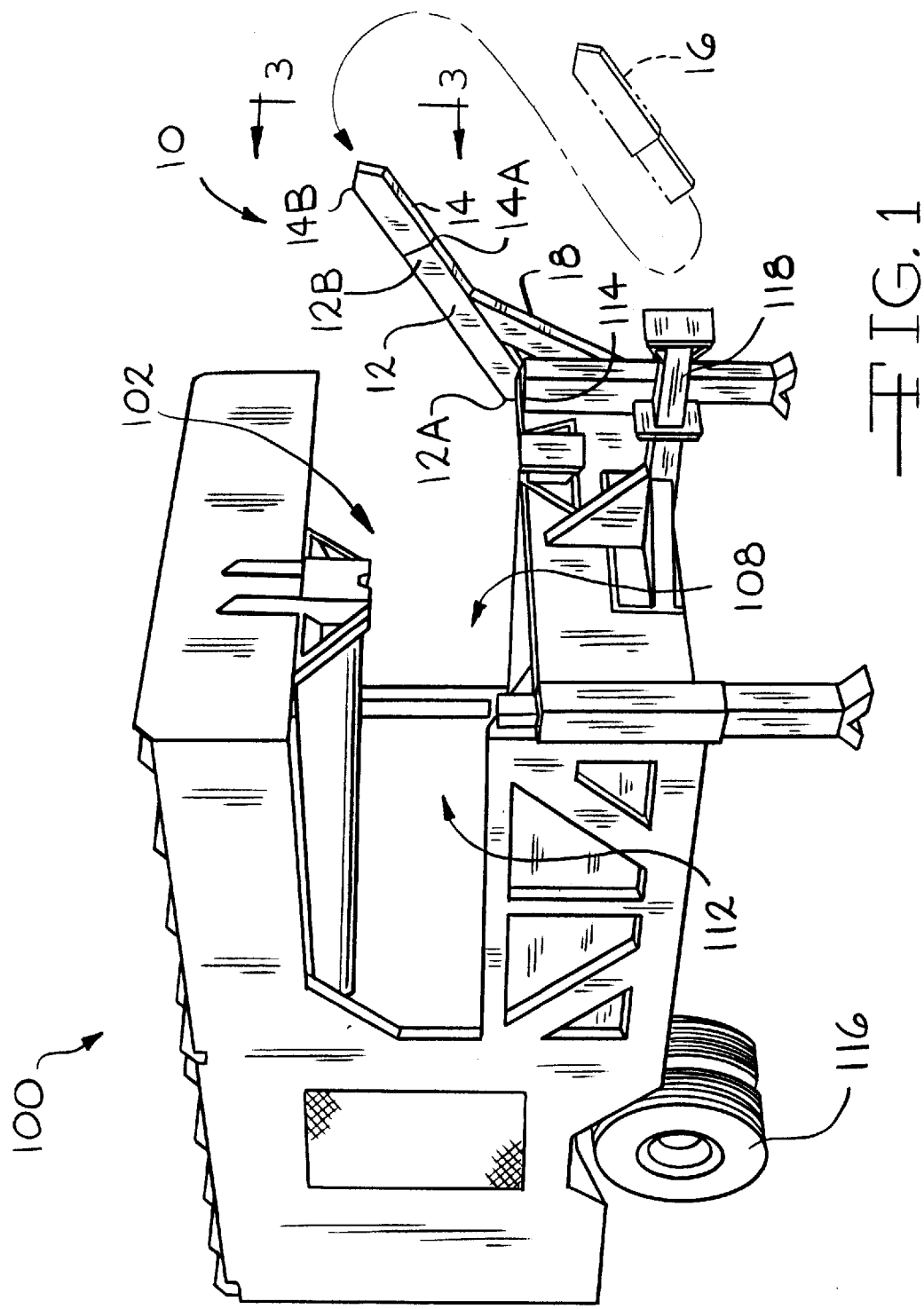

The present invention relates to an improved apparatus for debarking or removing limbs from trees which includes a horizontally oriented frame having opposed ends and opposed sides between the ends, a first drum means having a longitudinal axis and horizontally mounted between the opposed sides and between the ends of the frame for rotation on the axis, a first set of flail means mounted on and along the axis of the first drum means, a beam mounted on the frame and cantilevered over the frame and first drum means and between the ends and opposed sides of the frame; a second drum means mounted on the beam and having a longitudinal axis which is horizontal and essentially parallel to and spaced apart from the axis of the first drum means such that there is an opening leading into a space between the first drum means and the second drum means, a second set of flail means mounted on and along the axis of the second drum means in the space which along with the flail means of the first drum means provides the debarking or the limb removal, and power means mounted on the frame and connected to the first and second drum means for providing rotation of the first and second drum means and first and second set of flail means for the debarking or limb removal, wherein at least one tree with limbs and bark can be moved into the opening and the space between the first and second drum means for debarking or limb removal, the improvement which comprises: a feed arm having opposed ends and mounted at one end on the end of the frame adjacent the first and second drum means and extending outward away from the first and second drum means for guiding the trees into the opening and the space between the first and second drum means.

Further, the present invention relates to a feed arm for use on an apparatus for debarking or removing limbs from trees using flail means having an end opening adjacent the flail means, which comprises: a first section having opposed ends and mountable on one end to a frame of the apparatus adjacent the end opening so that the first section extends outward away from the end opening of the apparatus; and a second section having opposed ends and coaxially mounted at one end on the other end of the first section opposite the opening of the apparatus wherein the arm guides the trees inward toward the end opening and the flail means of the apparatus.

Still further, the present invention relates to an improved method for debarking or removing limbs from trees, which comprises: providing an improved apparatus which includes a horizontally oriented frame having opposed ends and opposed sides between the ends, a first drum means having a longitudinal axis and horizontally mounted between the opposed sides and between the ends of the frame for rotation on the axis, a first set of flail means mounted on and along the axis of the first drum means, a beam mounted on the frame and cantilevered over the frame and the first drum means and between the ends and opposed sides of the frame, a second drum means mounted on the beam and having a longitudinal axis which is horizontal and essentially parallel to and spaced apart from the axis of the first drum means such that there is an opening leading into a space between the first drum means and the second drum means, a second set of flail means mounted on and along the axis of the second drum means in the space which along with the flail means of the first drum means provides the debarking or the limb removal, a feed arm having opposed ends and mounted at one end on the end of the frame adjacent the first and second drum means and extending outward away from the first and second drum means for guiding the trees into the opening and the space between the first and second drum means, and power means mounted on the frame and connected to the first and second drum means for providing rotation of the first and second drum means and first and second set of flail means for the debarking or limb removal, wherein at least one tree with limbs and bark can be moved into the opening and the space between the first and second drum means for debarking or limb removal, comprising the steps of: positioning at least one tree on the arm adjacent the opening; and moving the tree into the opening and the space between the first and second drum means so that the tree is in contact with the first and second set of flail means, whereby the limbs or bark are removed from the tree.

Figure 2:
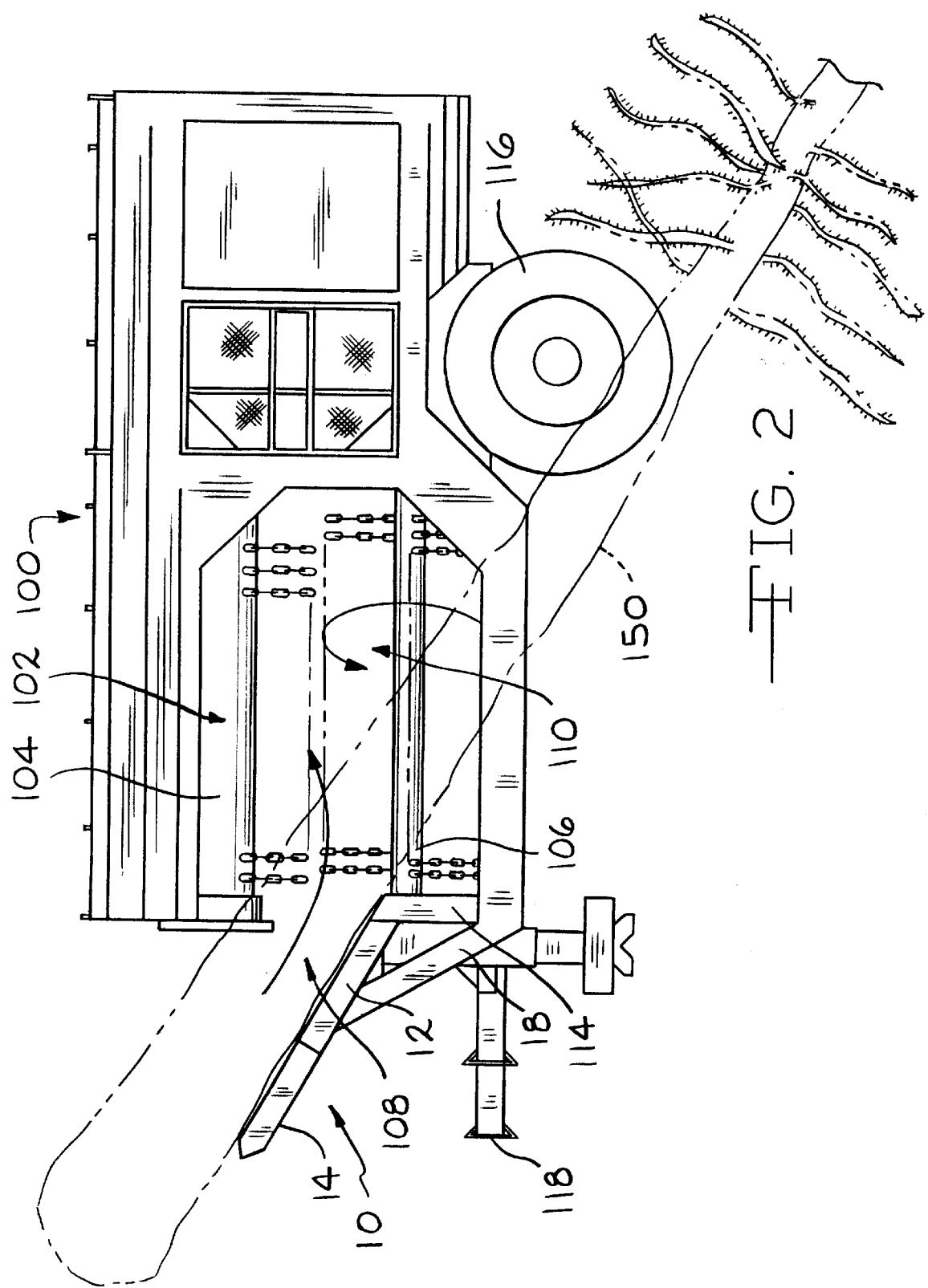

FIG. 1 shows the guide arm or feed arm 10 of the present invention mounted on a debarking and delimbing machine 100. The machine 100 is preferably easily transportable to the site to be cleared or thinned. The machine 100 preferably has wheels 116 and a hitch 118 which allows the machine 100 to be towed. The hitch 118 preferably extends outward from the lower frame 114 of the machine 100 away from the end opening 108 of the machine 100. The debarking and delimbing machine 100 has an end opening 108 with side openings 110 and 112 within which is located the flailing station 102. The flailing station 102 has upper and lower flailing drums 104 and 106 having flailing chains and positioned perpendicular to the end opening 108 of the machine 100 (FIG. 2). The end opening 108 and side openings 110 and 112 of the machine 100 allow for moving trees 150, to be debarked and delimbed, through the flailing station 102 between the upper and lower flailing drums 104 and 106. The trees 150 are moved into the flailing station 102 through the infeed side opening 110 and are removed from the flailing station 102 through the other side opening 112 after being debarked and delimbed in the flailing station 102. The end opening 108 between the side openings 110 and 112 allows for continuous holding and moving of the trees 150 by a loader 120 as the trees 150 pass through the flailing station 102. The debarking and delimbing machine 100 is preferably similar to that described in U.S. Pat. No. 4,787,431 to Demlow.

Figure 3:
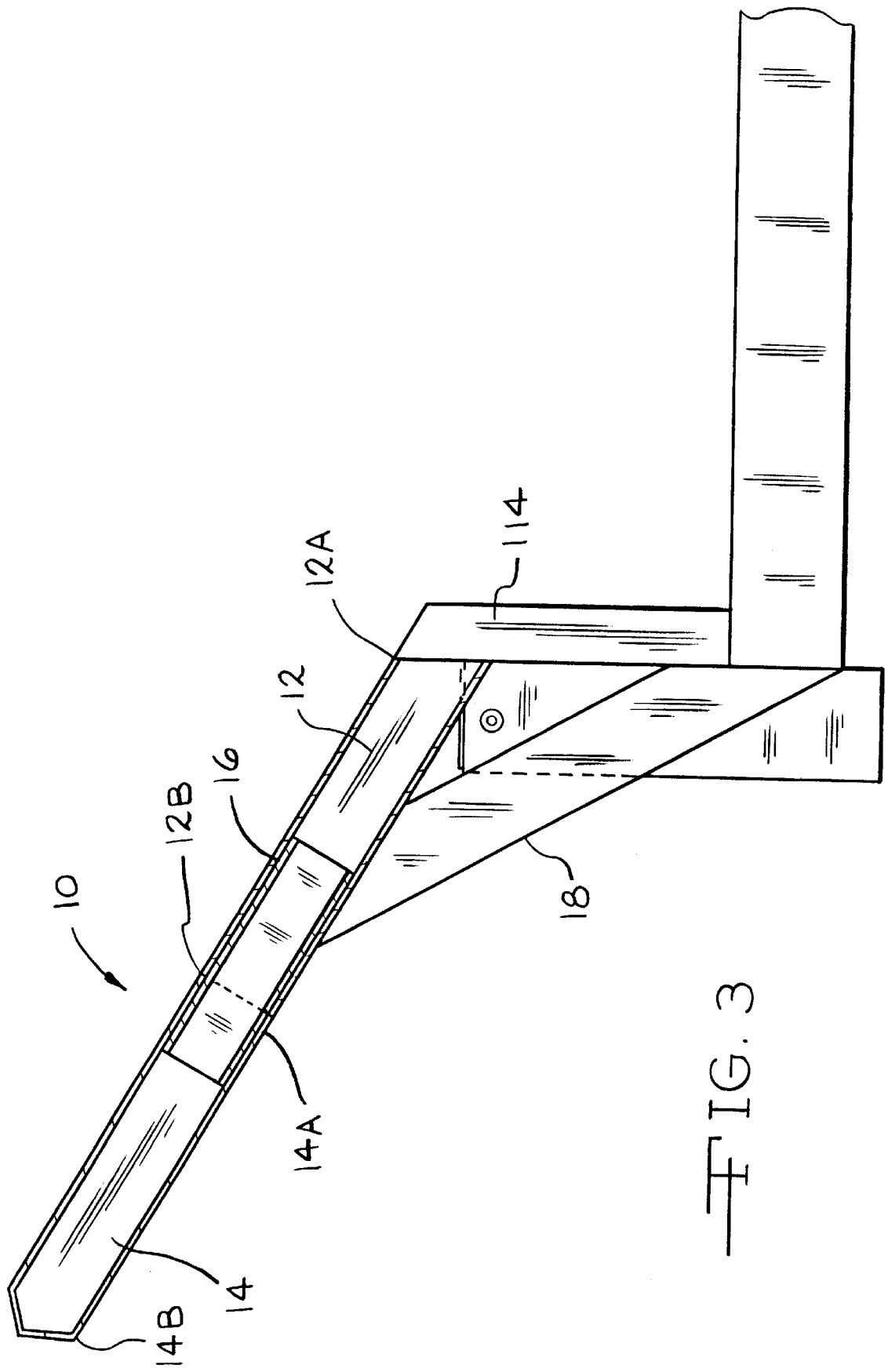

The feed arm lo is mounted on the lower frame 114 of the machine 100 at the infeed side opening 110 of the lower frame 114 adjacent the end opening 108. The feed arm 10 includes a first section 12 and a second section 14 which are removably attached together (FIG. 3). The first end 12A of the first section 12 is fastened to the lower frame 114 of the machine 100. The first section 12 is preferably permanently mounted to the lower frame 114. The first section 12 can be mounted to the lower frame 114 by any well known means such as welding. The first end 12A of the first section 12 is preferably angled such that when the first section 12 is correctly fastened to the frame 114, the first section 12 extends outward away from the end opening 108 and upward away from the lower frame 114. The first section 12 and consequently the feed arm 10 preferably extends upward at a slope of between about 25 and 35°.

The second section 14 of the feed arm 10 is slidably and removably mounted to the second end 12B of the first section 12. The second section 14 is preferably mounted co-axial with the first section 12. An insert 16 is preferably securely mounted inside the first end 14A of the second section 14 and extends outward away from the first end 14A of the second section 14. The insert 16 is preferably mounted co-axial with the second section 14. When the arm 10 is connected together, the second end 12B of the first section 12 is preferably slidably and removably mounted on the portion of the insert 16 extending beyond the first end 14A of the second section 14 (FIG. 1). The insert 16 is preferably of a size as to firmly and securely fit within the inside of the first and second sections 12 and 14. The second end 14A of the second section 14 is preferably angled such that the end of the section 14 comes to an angled point between the top and bottom of the second section 14. The top and bottom of the second end 14B of the second section 14 are preferably cut at a 45° angle. End plates (not shown) are mounted on the second end 14B of the second section 14 so that the end 14B is closed and debris is not able to enter the inside of the arm 10.

A brace 18 is preferably positioned between the lower frame 114 of the machine 100 and the first section 12 of the feed arm 10 (FIG. 3). The brace 18 preferably extends from the lower frame 114 of the machine 100 to adjacent the second end 12B of the first section 12. The brace 18 acts to provide support to the first section 12 of the feed arm 10 to prevent the feed arm 10 from collapsing due to the weight of the trees 150.

The first and second sections 12 and 14 and insert 16 are all preferably constructed of hollow rectangular, tubular steel. The first and second sections 12 and 14 are preferably 6.0 inches (15.2 cm) in height, with a width of 4.0 inches (10.2 cm) and are constructed of 0.5 inch (1.3 cm) thick steel. The first and second sections 12 and 14 preferably have a length of 30.0 inches (76.2 cm) each such that the arm 10 has a total length of 60.0 inches (152.4 cm). The arm 10 is preferably of such a length as to extend outward past the end of the hitch 118 of the machine 100. In the preferred embodiment, the first end 12A of the first section 12 is cut at a 30° angle. Thus, the feed arm 10 extends upward at a 30° angle with respect to the horizontal lower frame 114 of the machine 100 (FIG. 3). The insert 16 is made of smaller, rectangular tubular steel having a height of 5.0 inches (12.7 cm), a width of 3.0 inches (7.6 cm) and is preferably constructed of 0.375 inch (0.953 cm) thick steel. The insert 16 preferably has a length of 18.0 inches (45.7cm) and is mounted such that 12.0 inches (30.5 cm) extend into the first section 12 and 6.0 inches (12.2cm) are securably mounted to the second section 14.

The brace 18 is constructed of the same size hollow rectangular, tubular steel as the first and second sections 12 and 14. The ends of the brace 18 are preferably both cut at a 60° angle such that the brace 18 can extend at an angle between the lower frame 114 of the machine 100 and the first section 12 of the feed arm 10. The brace 18 preferably has a length of 43.5 inches (110.5 cm).

IN USE

The machine 100 is preferably moved to and positioned adjacent an area to be thinned. In the preferred embodiment, the second section 14 of the feed arm 10 with the insert 16 is removed from the first section 12 of the feed arm 10 prior to transporting the machine 100. Once the machine 100 is on location, the second section 14 is attached to the first section 12. When the second section 14 is attached and the feed arm 10 is full length, the feed arm 10 preferably extends outward beyond the end of the machine 100 and beyond the end of the hitch 118 (FIG. 2). To attach the second section 14, the portion of the insert 16 extending beyond the first end 14A of the second section 14 is inserted into the second end 12B of the first section 12 until the first end 14A of the second section 14 and the second end 12B of the first section 12 are in contact. In the preferred embodiment, the insert 16 is of such a size as to easily slide within the interior of the tubular first section 12 without extraneous side to side motion. Once connected to the first section 12, the second section 14 remains in place due to the close fit of the insert 16 inside the first section 12. In addition, since the first section 12 is angled upward, gravity also acts to keep the second section 14 in place on the first section 12. Once the feed arm 10 is at full length, the machine 100 is ready to be used.

Figure 4:
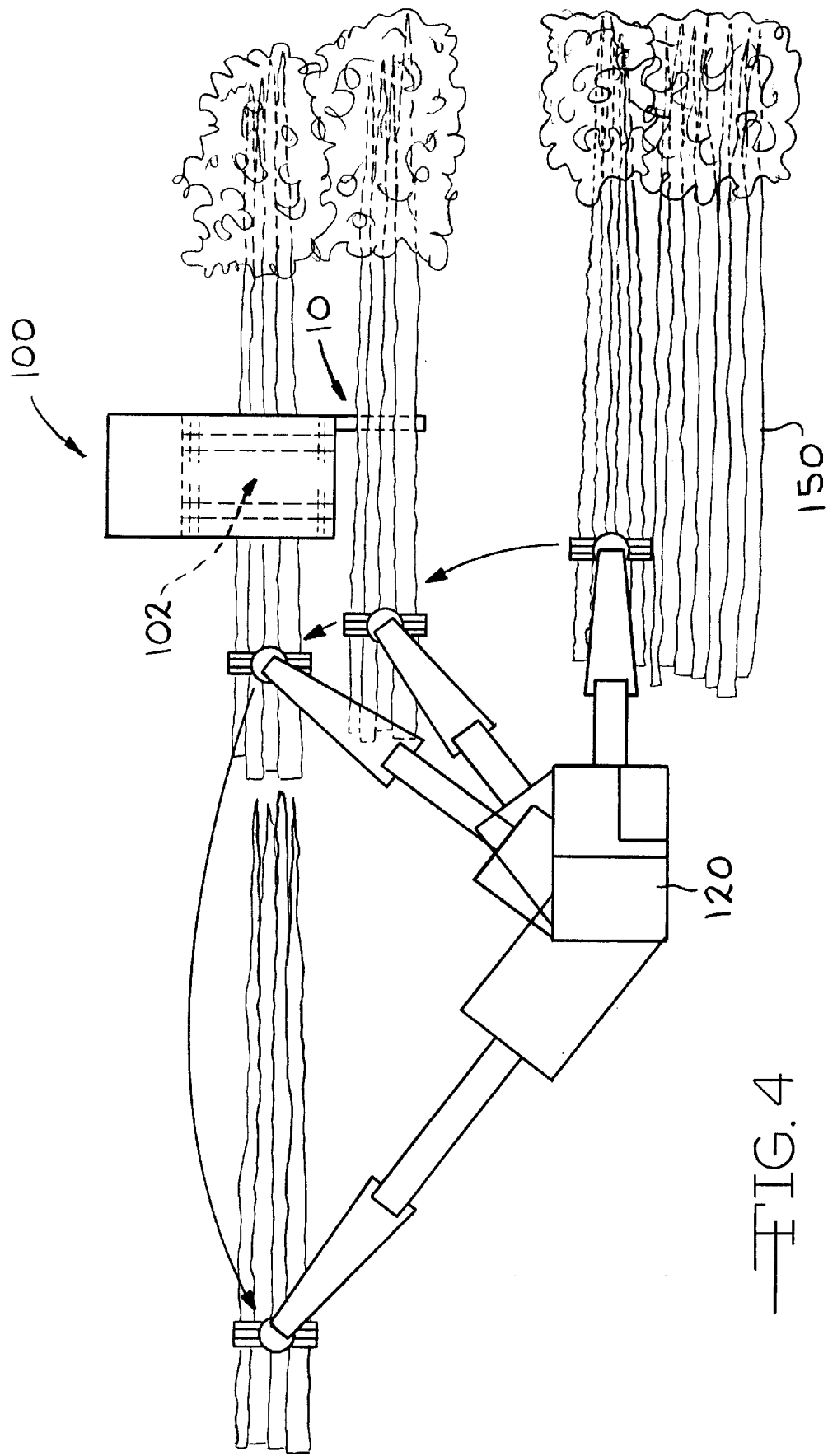

To use the machine 100, the flailing station 102 of the machine 100 is activated. Next, a loader 120, such as a knuckleboom loader or similar device is used to grasp, lift and drag the trees 150 to be debarked and delimbed (FIG. 4). A loader 120 is preferably a vehicle having a claw mounted on a boom which is used to grab onto the butt end of the trees 150 to drag the trees 150 from one location to another. The loader 120 is preferably positioned adjacent and spaced in front of the end opening 108 of the machine 100. Once the loader 120 has grasped the trees 150, the loader 120 moves the trees 150, by dragging and pulling, toward the infeed side opening 110 and end opening 108 of the machine 100. The loader 120 moves the trees 150 toward the openings 108 and positions the trees 150 adjacent the infeed side opening 110 and the end opening 108. In the initial position, the trees 150 are positioned with the butt end of the trees 150 between the feed arm 10 and the end opening 108 of the machine 100 adjacent the infeed side opening 110. The loader 120 continues to pull on the trees 150. Due to the nature of a loader 120, only the butt end of the trees 150 are off the ground when the trees 150 are moved. Thus, as the loader 120 continues to drag and pull the trees 150, the trees 150 gradually come in contact with the feed arm 10 (FIG. 2). The angling of the feed arm 10 help the trees 150 to move down the feed arm 10 and into the end opening 108 and between the flail drums 104 and 106. The feed arm 10 enables the loader 120 to easily position the trees 150 in the flailing station 102 between the upper and lower flail drums 104 and 106 of the flailing station 102 such that the trees 150 are resting on the lower flail drum 106. The loader 120 is able to move trees 150 through the flailing station 102 in a continuous motion without the need to stop the movement of the trees 150 to position the trees 150. The feed arm 10 aids in positioning the trees 150 into the flailing station 102 between the upper and lower flail drums 104 and 106 so that the trees 150 move completely through the station 102 and are thoroughly debarked and delimbed.

It is intended that the foregoing description be only illustrative of the present invention and that the present invention be limited only by the hereinafter appended claims.

I claim:

1. In an improved apparatus for debarking or removing limbs from trees which includes a horizontally oriented frame having opposed ends and opposed sides between the ends, a first drum means having a longitudinal axis and horizontally mounted between the opposed sides and between the ends of the frame for rotation on the axis, a first set of flail means mounted on and along the axis of the first drum means, a beam mounted on the frame and cantilevered over the frame and first drum means and between the ends and opposed sides of the frame; a second drum means mounted on the beam and having a longitudinal axis which is horizontal and essentially parallel to and spaced apart from the axis of the first drum means such that there is an opening leading into a space between the first drum means and the second drum means, a second set of flail means mounted on and along the axis of the second drum means in the space which along with the flail means of the first drum means provides the debarking or the limb removal, and power means mounted on the frame and connected to the first and second drum means for providing rotation of the first and second drum means and first and second set of flail means for the debarking or limb removal, wherein at least one tree with limbs and bark can be moved into the opening and the space between the first and second drum means for debarking or limb removal, the improvement which comprises:

a feed arm having opposed ends and mounted at one end on the end of the frame adjacent the first and second drum means and extending outward away from the first and second drum means for guiding the trees into the opening and the space between the first and second drum means.

2. The apparatus of claim 1 wherein the arm extends outward at an upward angle.

3. The apparatus of claim 2 wherein the angle of incline of the arm is between the range of 25° and 35°.

4. The apparatus of claim 1 wherein the arm includes a first section having opposed ends and mounted at one end on the frame and a second section having opposed ends and removably mounted at one end on the other one of the ends of the first section such that the second section is removable from the first section when not in use.

5. The apparatus of claim 1 wherein a brace is provided between the arm and the frame for reinforcing the arm.

6. The apparatus of claim 1 wherein the apparatus has a hitch for towing the apparatus and wherein the arm has a length such as to extend outward beyond the hitch of the apparatus.

7. A feed arm for use on an apparatus for debarking or removing limbs from trees using flail means having an end opening adjacent the flail means, which comprises:

a first section having opposed ends and mountable on one end to a frame of the apparatus adjacent the end opening so that the first section extends outward away from the end opening of the apparatus; and a second section having opposed ends and coaxially mounted at one end on the other end of the first section opposite the opening of the apparatus wherein the arm guides the trees inward toward the end opening and the flail means of the apparatus.

8. The arm of claim 7 wherein the first section is mounted on the frame of the apparatus adjacent a side of the apparatus.

9. The arm of claim 7 wherein the first section is mounted on the frame such as to extend upward at an angle towards a top of the frame.

10. The arm of claim 9 wherein the angle of incline of the arm is between about 25° and 35°.

11. The arm of claim 7 wherein the second section is removably mounted on the first section such that the second section is removable when not in use.

12. An improved method for debarking or removing limbs from trees, which comprises:

(a) providing an improved apparatus which includes a horizontally oriented frame having opposed ends and opposed sides between the ends, a first drum means having a longitudinal axis and horizontally mounted between the opposed sides and between the ends of the frame for rotation on the axis, a first set of flail means mounted on and along the axis of the first drum means, a beam mounted on the frame and cantilevered over the frame and the first drum means and between the ends and opposed sides of the frame, a second drum means mounted on the beam and having a longitudinal axis which is horizontal and essentially parallel to and spaced apart from the axis of the first drum means such that there is an opening leading into a space between the first drum means and the second drum means, a second set of flail means mounted on and along the axis of the second drum means in the space which along with the flail means of the first drum means provides the debarking or the limb removal, a feed arm having opposed ends and mounted at one end on the end of the frame adjacent the first and second drum means and extending outward away from the first and second drum means for guiding the trees into the opening and the space between the first and second drum means, and power means mounted on the frame and connected to the first and second drum means for providing rotation of the first and second drum means and first and second set of flail means for the debarking or limb removal, wherein at least one tree with limbs and bark can be moved into the opening and the space between the first and second drum means for debarking or limb removal, comprising the steps of:

(b) positioning at least one tree on the arm adjacent the opening; and (c) moving the tree into the opening and the space between the first and second drum means so that the tree is in contact with the first and second set of flail means, whereby the limbs or bark are removed from the tree.

13. The method of claim 12 wherein the arm is mounted at an angle and wherein to move the trees into the opening and the space between the drum means, the trees are pulled, perpendicular to a longitudinal axis of the arm so that the arm guides the trees into the opening and the space.

14. The method of claim 12 wherein the arm includes a first section having oposed ends and mounted at one end on the frame and a second section having opposed ends and removably mounted at one end on the other one of the ends of the first section such that the second section is removable when not in use and wherein prior to step (b), the second section is mounted on the first section.

* * * * *